June 7, 1955     W. P. PETERSON     2,710,334
LIGHT AND MOUNTING STRUCTURE THEREFOR Filed Dec. 13, 1951     2 Sheets-Sheet 1

INVENTOR.
Wilber P. Peterson.
BY
Fishburn & Mullendore
ATTORNEYS.

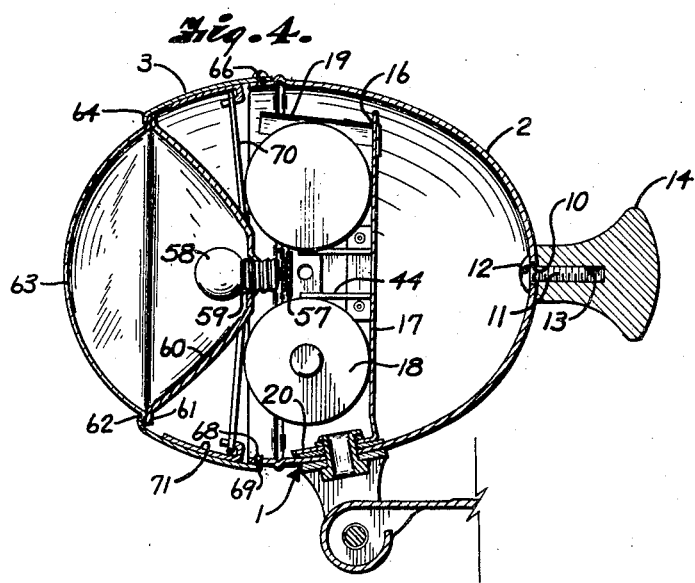

United States Patent Office 2,710,334
Patented June 7, 1955

2,710,334

LIGHT AND MOUNTING STRUCTURE THEREFOR

Wilber P. Peterson, Kansas City, Mo., assignor to Northeast Tool and Die Works, Inc., Kansas City, Mo., a corporation of Missouri Application December 13, 1951, Serial No. 261,450

4 Claims. (Cl. 240—7.55)

This invention relates to lights and more particularly to self-contained lights and swivel mountings therefor adapted for use as spot lights on bicycles, boats or the like, the bezel, shell and battery assembly frame being somewhat similar to that disclosed in my prior Patent No. 2,320,446, issued June 1, 1943.

The objects of the invention are to provide a self-contained light with a battery mounting and separator frame in a shell portion and a bracket exteriorly of the shell all secured together with a connecting means which rigidly connects the frame and shell and permits swivelling of the bracket thereon; to provide a self-contained light and mounting for substantially universal movement of the light; and to provide a self-contained light and mounting which is compact, convenient to direct, economical to manufacture and assemble, and of neat, attractive appearance.

In accomplishing these and other objects of the present invention, I have provided improved details of structure, the preferred form of which is illustrated in the accompanying drawings, wherein:

Fig. 4 is a longitudinal vertical sectional view through the light illustrated in Fig. 1.

Fig. 5 is a detail perspective view of the shell section, battery mounting frame, bracket and connector structure shown in disassembled relation.

Figure 1:
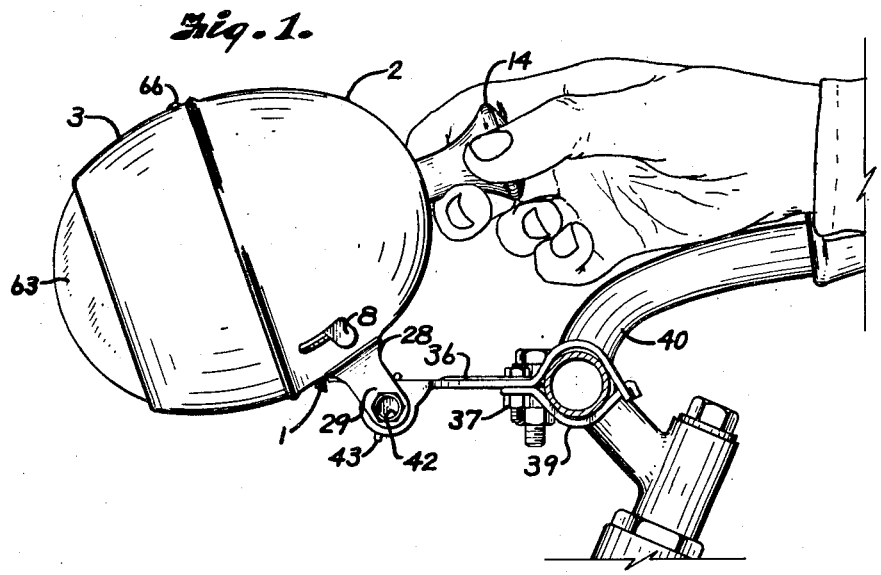
Fig. 1 is a perspective view of a light and mounting therefor embodying the features of the present invention arranged on the handle bars of a bicycle.
Figure 2:
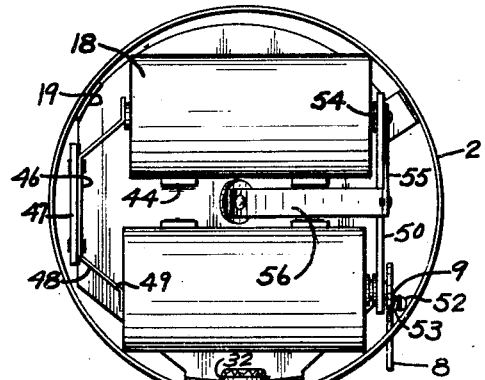
Fig. 2 is a front elevational view of the light structure with the bezel section removed.

Referring more in detail to the drawings:

1 designates a light having a shell section 2 and a bezel section 3. The shell section is preferably of hollow structure generally simulative of approximately one-half of an egg shell and having spaced longitudinally arranged slots 4 and 5 in a portion thereof preferably adjacent the periphery 6 of the shell section, said slots 4 and 5 being in the bottom portion of said shell section. An additional longitudinally arranged slot 7 is provided in the shell section 2 for outward projection of an arm 8 of a switch element 9 arranged within the shell section. The rear or closed portion of the shell section 2 has an axially arranged aperture 10 through which the threaded shank 11 of a screw 12 extends, the head of the screw being on the inside of the shell section and in engagement therewith. The threaded shank 11 is screwed into the threaded bore 13 of a handle member 14 for securing the handle to the shell section for use in manipulating the light as later described.

Figure 3:
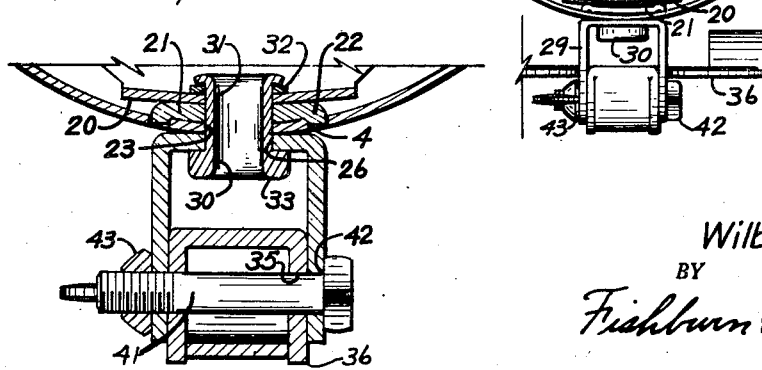
Fig. 3 is an enlarged detail vertical sectional view through the universal mounting structure of the light.

A battery assembly frame 16 is formed of sheet material and of a size and shape arranged for fitting within the shell section 2 in such a manner that the frame forms a vertical wall 17 spaced from the periphery 6 of the shell slightly less than the diameter of conventional flash light batteries 18. The upper portion of the frame is provided with laterally spaced forwardly extending arms 19 resiliently engaging the inner surface of the shell section. The lower portion of the frame 16 has a forwardly extending flange 20 which rests on a U-shaped member 21 arranged transversely between the slots 4 and 5 with the legs 22 thereof extending downwardly into the slots 4 and 5, said legs preferably being of such length that they engage in said slots but do not extend exteriorly of the shell. The bar portion between the legs 22 of the U-shaped member 21 is arcuate in one direction to substantially conform to the shape of the shell engaged thereby. Also the lower flange 20 on the frame 16 is arcuate in shape to substantially conform to the surface of the bar portion of the U-shaped member as shown in Fig. 3. The engagement of these arcuate portions aids in retaining these members in selected position.

The shell section is provided with an aperture 23 centrally located between the slots 4 and 5 and registering with an aperture 24 in the U-shaped member 21, an aperture 25 in the flange 20, and an aperture 26 in a bar portion 27 of a bracket 28 arranged exteriorly of the shell section in such a manner that spaced ears 29 on the bracket extend outwardly from the shell section. The shank 30 of a pivot pin such as a rivet or the like 31 extends through the registering apertures 26, 23, 24 and 25 and through a lock washer 32 arranged on the upper surface of the flange 20. The head 33 of the rivet engages the undersurface of the bar portion 27 of the bracket 28. The end of the shank 30 is provided with a fastening device which in the illustrated structure is a peened or otherwise flattened end thereof, in securing relation with the lock washer for holding the frame, U-shaped member, shell and bracket together. The engagement of the legs of the U-shaped member in the slots 4 and 5 of the shell section and engagement of the lock washer with the U-shaped member and flattened portion of the rivet shank 30 cooperate with the arcuate shape of the engaged portions of the U-shaped member 21 and flange 20 to rigidly secure the frame and shell section together. The bracket 28 will rotate about the shank of the rivet but the engagement of the bracket with the shell section and rivet head is such that the friction therebetween provides some resistance to turning and prevents looseness in the mounting. Therefore, while the shell section will turn on the bracket about the axis of the rivet shank, the friction will hold them in selected position, and also prevent relative movement of the shell section and bracket due to vibration.

The ears 29 of the bracket are provided with suitable aligned apertures 34 registering with apertures 35 in an arm 36 having suitable fastening devices 37 and clamp structure 38 for fastening the arm to handle bars 40 of a bicycle or other suitable support of a bicycle, boat or the like. The shank 41 of a bolt 42 extends through the apertures 34 and 35 to provide a rotatable connection between the bracket and arm, the axis of the bolt 42 being perpendicular to the axis of the pivot pin 31. A nut 43 is threaded on the end of the shank 41 whereby tightening of said nut draws same into engagement with one of the ears 29 and the head of the bolt into engagement with the other to tighten same against the arm 36 and provide sufficient friction therebetween to resist relative rotation whereby the shell section 2 may be rotated about the axis of the shank 41 but normal operation will not disturb the selected position of the shell section.

In the structure illustrated, the wall 17 of the frame 16 has vertically and horizontally spaced aligned outwardly struck arms 44 that collectively form separators for the batteries 18 preferably arranged horizontally in the shell. The side portions of the wall 17 are provided with outwardly directed flanges 45 and 46. Insulating material 47 is suitably secured to the flange 46 and extends outwardly therefrom and carries a contact member 48 spaced from the flange 46 and having end portions 49 adapted to resiliently engage ends of batteries 18.

An insulating strip 50 is suitably secured to the inner face of the flange 45 and extends outwardly therefrom. The insulating strip 50 has a contact member 51 mounted in and extending therethrough for engagement with one terminal end of a battery and also adapted to be engaged by one end of the switch member 9 which is rotatably mounted on a pin 52 secured in the strip 50. The other end of the switch member engages the flange 45 to form a ground connection for the battery circuit. Swinging of the switch arm 8 moves the switch element 9 out of engagement with the contact 51 thereby breaking the ground connection of the battery circuit. A spring 53 is arranged on the pin 52 to resiliently urge the switch element into engagement with the contact 51 and flange 45 when positioned to connect same.

The adjacent terminal end of the other battery engages a contact member 54 connected to a strip 55 which has a portion 56 extending forwardly and inwardly for circuit-making contact with the conducting base 57 of a light bulb 58 that is threadedly mounted in a socket 59 of a reflector 60 of suitable curved conformation. The periphery 61 of the reflector is arranged for engagement with the periphery 62 of a suitable lens 63, the periphery of the lens being engageable with a retaining flange 64 at the outer periphery of the bezel section 3. The bezel section is adapted for sleeved engagement preferably externally of the shell section 2, both shell and bezel sections having aligned openings for receiving a fastening device 66 to retain the same in inner engaged relation after a centering ear 68 on the bezel section, for example, has been passed through a corresponding slot 69 in the shell section whereby the sections may be aligned and a fastening device applied to the apertures provided therefor to effect the noted inward engagement of the sections.

A resilient member 70 retains the reflector 60 in the bezel section and when the bezel section is assembled on the shell section, said resilient member engages the batteries 18 to resiliently retain same in the frame 16, the resilient member 70 engages the rear of the reflector and extends therefrom with the ends of said resilient member engaged with the lugs or the like 71 mounted on the interior of the bezel section.

In operating a light constructed and assembled as described, the switch arm 8 extending through the slot 7 is moved rearwardly as indicated, for example, in Fig. 1 to effect engagement of the switch element 9 with the contact 51 and the flange 45 to complete the battery circuit and energize the light bulb 58. Then by grasping the handle 14 the light may be tilted forwardly or rearwardly about the axis of the screw shank 41. Also the light may be swung laterally about the axis of the shank 30 of the rivet 31 which rotates in the aperture 26 of the bracket 28. It is apparent, therefore, that the light may be directed as desired and due to the frictional engagement of the pivotal connections the light will remain in selected position.

It is believed obvious that I have provided a light and mounting therefor which is compact and of neat, attractive appearance, economical to manufacture and assemble, yet providing efficient, selective directing of the light.

What I claim and desire to secure by Letters Patent is:

1. In a light of the character described, a shell section, a portion of said shell section having a pair of spaced slots therein, a bar member in the shell between the spaced slots, means on said bar member engaged in the spaced slots, a battery supporting plate in the shell, a flange on said plate and engaging the bar member, said bar and flange having cooperating interengaged portions which resist relative rotation thereof, a bracket engaging the shell exteriorly and in alignment with the plate flange and bar member, said shell and plate flange and bar member and bracket having aligned apertures, a pin extending through said aligned apertures, a head on the pin engaging the bracket, and lock means on the pin cooperating with the head and the cooperating interengaging portions on the bar and flange whereby the shell and bar member and pin and battery supporting plate are rigidly held by the pin against relative rotation with the bracket rotatable on the pin and frictionally engaging the head and shell for resisting rotation about the axis of the pin.

2. In a light of the character described, a shell section, a portion of said shell section having a pair of spaced slots therein, a U-shaped member in the shell and having a bar portion engaged therewith with the legs of said member extending into the spaced slots in outwardly directed relation thereto and the bar portion between the legs being substantially arcuate shape in one direction to conform to the shape of the portion of the shell engaged thereby, a battery supporting plate in the shell, a flange on said plate and engaging the surface of the U-shaped member and substantially conforming to the arcuate shape of the bar portion thereof, a bracket engaging the shell exteriorly and in alignment with the plate flange and U-shaped member, said shell and plate flange and U-shaped member and bracket having aligned apertures, a pin extending through said aligned apertures, a head on the pin engaging the bracket, lock means on the pin engaging the plate flange and cooperating with the arcuate shape of the bar portion of the U-shaped member and the flange on the battery supporting plate whereby the shell and U-shaped member and battery supporting plate are rigidly held by the pin against relative rotation with the bracket rotatable on the pin and frictionally engaging the head and shell for resisting rotation about the axis of the pin.

3. In a light of the character described, a thin-walled shell section, a portion of said shell section having a pair of spaced substantially parallel slots therein, a U-shaped member in the shell and having a bar portion engaged therewith with the legs of said member extending into the spaced slots in outwardly directed relation thereto and the bar portion between the legs being substantially arcuate in one direction to conform to the shape of the portion of the shell engaged thereby, a battery supporting plate in the shell, a flange on said plate and engaging the surface of the U-shaped member and substantially conforming to the arcuate shape of the bar portion thereof, a bracket engaging the shell exteriorly and in alignment with the plate flange and U-shaped member, said shell and plate flange and U-shaped member and bracket having aligned apertures, a pin extending through said aligned apertures, a lock washer on the pin and engaging the plate flange, a head on the pin engaging the bracket, a peened end on the pin engaging the lock washer and cooperating with the arcuate shape of the bar of the U-shaped member and flange on the battery supporting plate whereby the shell and U-shaped member and battery supporting plate are rigidly held in interengaged relation by the pin and against relative rotation and the bracket rotatable on the pin and frictionally engaging the head and shell for resisting rotation about the axis of the pin, means mounting the bracket for rotation about an axis perpendicular to the axis of the pin to effect a substantially universal mounting of the light, and a handle on the shell and extending rearwardly therefrom for moving the light about the respective axes of rotation for directing said light.

4. In a light of the character described, a shell section, a portion of said shell section having a pair of spaced slots therein, a U-shaped member in the shell with the legs of said member extending into the spaced slots in outwardly directed relation thereto, a battery supporting plate in the shell, a flange on said plate and engaging the surface of the U-shaped member, said bar and flange having cooperating interengaged portions which resist relative rotation thereof, a bracket engaging the shell exteriorly and in alignment with the plate flange and U-shaped member, said shell and plate flange and U- shaped member and bracket having aligned apertures, a pin extending through said aligned apertures to connect the shell and U-shaped member and battery supporting plate and bracket together with the bracket rotatable on the pin and frictionally engaging the shell for resisting rotation about the axis of the pin, means on the pin cooperating with the cooperating interengaging portions on the bar and flange for retaining the pin and shell and U-shaped member and battery supporting plate against relative rotation, and means mounting the bracket for rotation about an axis perpendicular to the axis of the pin to effect a substantially universal mounting of the light.

References Cited in the file of this patent

UNITED STATES PATENTS

| | | |
|---|---|---|
| 1,277,479 | Ritchie | Sept. 3, 1918 |
| 2,010,058 | Carlson | Aug. 6, 1935 |
| 2,320,446 | Peterson | June 1, 1943 |
| 2,579,018 | Schwinn | Dec. 18, 1951 |